No. 611,917. Patented Oct. 4, 1898.
W. J. KOEHLER.
TREATMENT OF ZINC AND COPPER ORES.
(Application filed Nov. 7, 1896.)
(No Model.)
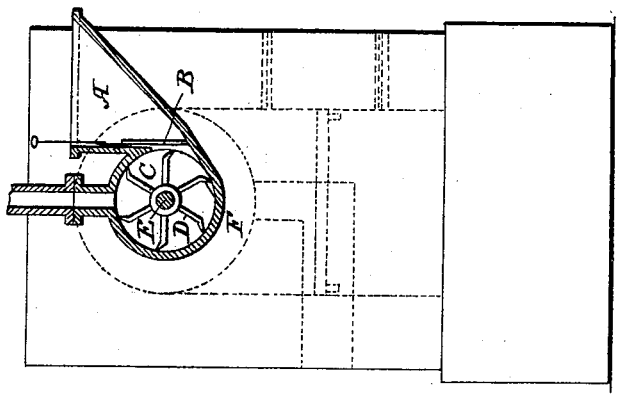
Fig. II.
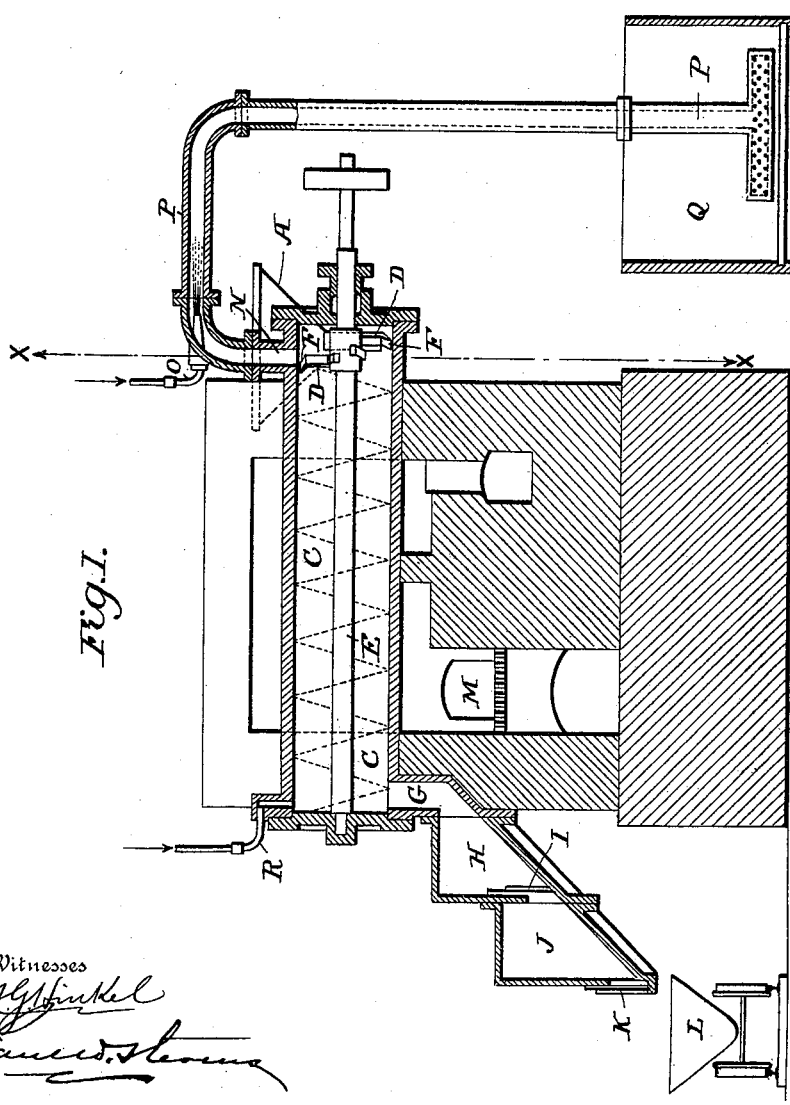
Fig. I.
Witnesses
Inventor
W. J. Koehler
by
Foster Freeman
Attorneys
THE NORRIS PETERS CO., PHOTO-LITHO., WASHINGTON, D. C.

UNITED STATES PATENT OFFICE.

WALTER JAEGER KOEHLER, OF BROKEN HILL, NEW SOUTH WALES, ASSIGNOR TO THE BROKEN HILL PROPRIETARY COMPANY, LIMITED, OF MELBOURNE, VICTORIA.

TREATMENT OF ZINC AND COPPER ORES.

SPECIFICATION forming part of Letters Patent No. 611,917, dated October 4, 1898.

Application filed November 7, 1896. Serial No. 611,376. (No specimens.)

*To all whom it may concern:*

Be it known that I, WALTER JAEGER KOEHLER, B. S., metallurgist, a citizen of the United States of America, residing at Broken Hill, in the Colony of New South Wales, have invented certain new and useful Improvements in the Treatment of Zinc and Copper Ores, of which the following is a full, clear, and exact description.

My invention relates more particularly to the treatment of zinc and copper bearing ores, or metallurgical products containing in the form of oxids the zinc or copper, or either of these metals alone or in combination with other metals.

For convenience the term "ore" is used in the following specification; but it is to be understood to include raw or roasted ore or metallurgical products containing zinc or copper in the form of oxids or basic or neutral sulfates or sulfites.

My invention consists, essentially, in the conversion of the zinc oxid (ZnO) and copper oxid (CuO) contained in such ore into sulfate of zinc ($ZnSO_4$) and sulfate of copper ($CuSO_4$) by means of ammonium sulfate, $(NH_4)_2SO_4$, in the presence of heat according to the formula:

$$ZnO + (NH_4)_2SO_4 = ZnSO_4 + 2NH_3 + H_2O,$$

the ammonia being given off in a gaseous form and the ammonium sulfate subsequently regenerated, as hereinafter described. The sulfate of zinc and the sulfate of copper so formed are leached out by water. Any copper present in the solution is precipitated by metallic zinc (spelter) according to the reaction:

$$CuSO_4 + Zn = Cu + ZnSO_4,$$

or by other suitable means. The ammonia ($NH_3$) generated in the sulfatizing operation is passed through the solution carrying the sulfate of zinc, precipitating the zinc as zinc hydrate, $Zn(HO)_2$, and regenerating the ammonium sulfate for the treatment of further quantities of ore. The reaction takes place according to the following formula:

$$ZnSO_4 + 2H_2O + 2NH_3 = Zn(HO)_2 + (NH_4)_2SO_4.$$

In carrying my invention into effect the ore is mixed with its proper proportion of ammonium sulfate, which I find in practice is about two units (more or less) of ammonium sulfate to each unit of zinc in the ore, but do not bind myself to such proportions. The ore is then treated in suitable closed vessels and with or without the addition of water or steam, the contents of such vessels being raised to a temperature approximately 300° to 500° centigrade or other suitable temperature. The reaction indicated then takes place, the zinc and copper being converted into soluble sulfates and free ammonia-gas being given off. The product of this operation, consisting of sulfates of zinc and copper with gangue or other insoluble residue, is leached with hot or cold water in suitable vessels. The soluble sulfates of zinc and copper are thereby dissolved and are separated from the gangue or insoluble residue, which may contain lead or other metals. The gangue or other insoluble residue can be treated by any well-known process for the recovery of its metallic contents. Any copper contained in the solution is precipitated by metallic zinc or other suitable means and removed for treatment by any well-known process before precipitation of the zinc as zinc hydrate by the ammonia-gas. Any iron in the solution can also be precipitated, if desired, by any suitble means.

The ammonia-gas produced in the closed vessels during the first operation is recovered by being passed through suitable vats, towers, or other apparatus containing sulfate-of-zinc solution, preferably that obtained by leaching the product of the first operation. By the action of the ammonia the zinc in the solution is precipitated as zinc hydrate, $Zn(HO)_2$, and ammonium sulfate, $(NH_4)_2SO_4$, regenerated.

The hydrate of zinc is separated from the solution of ammonium sulfate by filter-presses or other suitable means, and after washing, drying, or calcining may be used either as a pigment or zinc ore.

The solution of ammonium sulfate is evaporated down for recovery of ammonium sulfate in the solid form for use in the treatment of further quantities of ore.

My process can be carried into effect in any suitable apparatus. One convenient form is shown in the accompanying drawings, but is not claimed as part of my invention.

Figure I is a longitudinal sectional elevation of the apparatus, and Fig. II a cross-sectional elevation of the same upon the line X X of Fig. I.

The ore having been mixed with the proper proportion of ammonium sulfate is placed in a hopper A, having an adjustable door or opening B, by means of which the feed is regulated. From the hopper A the ore is drawn into the retort C by the action of revolving arms D, carried on a shaft E. The arms D are preferably provided with adjustable shoes F, so that by altering their angle the material may be fed through the retort C at any desired rate. As the shaft E revolves the mixture is stirred and gradually carried through the retort C to the discharge-opening G. Through the discharge-opening G it falls into a closed hopper H, provided with an adjustable door I, and again into a second closed hopper J, having a door K. On the hopper J being filled the door I is closed to prevent any ingress of air to retort C. The door K is then opened and the sulfatized material discharged into a truck, such as L, or other suitable arrangement for conveying the material to the leaching apparatus. (Not shown.) During the operation steam or water may, if desired, be injected into the retort C through a pipe R to facilitate the reaction.

The retort C is maintained at a suitable temperature, which may be from 300° to 500° centigrade, by means of a furnace, such as M, or any other equivalent means.

The ammonia-gas produced during the process in the retort C passes out through an opening N and by the action of an injector O or other suitable means is forced through a pipe P into a vat, such as Q, or other suitable vessel containing sulfate-of-zinc solution, obtained by leaching the treated ore. In order to avoid loss of ammonia-gas by leakage, the injector O or other suitable means should be so regulated as to maintain a slight vacuum in the retort. Ammonium sulfate in solution is thereby regenerated and can be evaporated to dryness for use in treatment of fresh quantities of ore.

While in the following claims I have defined my invention as used in connection with oxidized zinc-bearing ores, it is evident, as above set forth, that it can be used with ores bearing copper or other metals the affinities of which are such as to cause the same relative reactions by the same reagents, and my invention is therefore not limited to the treatment of oxidized zinc-bearing ores alone.

Having now particularly described and ascertained the nature of my said invention and in what manner the same is to be performed, I declare that what I claim is—

1. The method substantially as above described of treating oxidized zinc-bearing ores, which consists in heating said ores with an admixture of ammonium sulfate, thereby converting the oxids into sulfates and liberating free ammonia-gas.

2. The method substantially as above described of treating oxidized zinc-bearing ores, which consists in heating said ores with an admixture of ammonium sulfate, thereby converting the oxids into sulfates and liberating free ammonia-gas, and subsequently passing said gas through a solution of a metallic sulfate which will be decomposed to form ammonium sulfate.

3. The method substantially as above described of treating oxidized zinc-bearing ores, which consists in heating the ores with an admixture of ammonium sulfate, thereby converting the oxids into sulfates and liberating free ammonia-gas, then precipitating the metal from its solution in the form of a metallic hydrate by passing through it the liberated ammonia-gas.

4. The method substantially as above described of treating oxidized zinc-bearing ores, which consists in heating said ores with an admixture of ammonium sulfate, thereby converting the oxids into sulfates and liberating free ammonia-gas, then leaching by water the sulfates so obtained, and then precipitating the zinc from its solution in the form of zinc hydrate by passing through it the liberated ammonia-gas and regenerating the sulfate of ammonia.

WALTER JAEGER KOEHLER.

Witnesses:
EDWIN BLACKLER COLTON,
FRANCIS HUGH SNOW.